US012654631B2

(12) United States Patent
Hart

(10) Patent No.: US 12,654,631 B2
(45) Date of Patent: Jun. 16, 2026

(54) MOUNTING ARRANGEMENT FOR A DRIVER ASSIST SYSTEM

(71) Applicant: ZF Active Safety and Electronics US LLC, Livonia, MI (US)

(72) Inventor: Michael A. Hart, Dexter, MI (US)

(73) Assignee: ZF Active Safety and Electronics US LLC, Livonia, MI (US)

( * ) Notice: Subject to any disclaimer, the term of this patent is extended or adjusted under 35 U.S.C. 154(b) by 335 days.

(21) Appl. No.: 16/762,330

(22) PCT Filed: Nov. 8, 2018

(86) PCT No.: PCT/US2018/059822
§ 371 (c)(1),
(2) Date: May 7, 2020

(87) PCT Pub. No.: WO2019/094588
PCT Pub. Date: May 16, 2019

(65) Prior Publication Data
US 2021/0370843 A1    Dec. 2, 2021

Related U.S. Application Data

(60) Provisional application No. 62/583,208, filed on Nov. 8, 2017.

(51) Int. Cl.
| *G03B 17/02* | (2021.01) |
| *B60R 11/04* | (2006.01) |
| *B60R 11/00* | (2006.01) |

(52) U.S. Cl.
CPC ....... *B60R 11/04* (2013.01); *B60R 2011/0059* (2013.01)

(58) Field of Classification Search
CPC ........................ B60R 2011/0059; B60R 11/04
See application file for complete search history.

(56) References Cited

U.S. PATENT DOCUMENTS

| 6,587,152 | B1 | 7/2003 | Sharp et al. | |
| 2015/0109447 | A1* | 4/2015 | Okuda | B60R 11/04 |
| | | | | 348/148 |
| 2016/0009230 | A1* | 1/2016 | Miyado | B60R 11/04 |
| | | | | 224/482 |
| 2016/0023620 | A1* | 1/2016 | Matori | G03B 17/02 |
| | | | | 348/148 |
| 2016/0257265 | A1* | 9/2016 | Kageyama | B60R 11/04 |
| 2017/0277020 | A1* | 9/2017 | Kasai | G03B 17/561 |

* cited by examiner

*Primary Examiner* — Patrick E Demosky
(74) *Attorney, Agent, or Firm* — Kristin L. Murphy

(57) ABSTRACT

A vehicle driver assist system includes a mounting bracket connectable with the vehicle and a camera housing connectable with the mounting bracket. One of the mounting bracket and the camera housing includes a channel for receiving a tab on the other of the mounting bracket and the camera housing. The tab on the other of the mounting bracket and the camera housing slides into the channel in the one of the mounting bracket and the camera housing to connect the camera housing to the mounting bracket. The one of the mounting bracket and the camera housing has a flexible member that engages the tab to damp movement of the housing relative to the mounting bracket.

12 Claims, 10 Drawing Sheets

MOUNTING ARRANGEMENT FOR A DRIVER ASSIST SYSTEM

CROSS-REFERENCE TO RELATED APPLICATION

This application is a national stage of International Application No. PCT/US18/59822 filed Nov. 8, 2018, the disclosure of which is incorporated herein by reference in its entirety, and which claimed priority to U.S. Provisional Patent Application No. 62/583,208, filed Nov. 8, 2017, the disclosure of which is incorporated herein by reference in its entirety.

TECHNICAL FIELD

The present invention is directed to a mounting arrangement for a driver assist system and, more particularly, to a mounting arrangement for a driver assist system in which a camera housing may be slid into a mounting bracket to connect the camera housing to the mounting bracket.

BACKGROUND

Vehicle driver assist systems that use a camera to monitor the environment surrounding the vehicle are known. For example, one particular type of driver assist system monitors the area in front of the vehicle and uses a forward looking camera. It is common to mount a forward looking driver assist system to the front windshield of the vehicle. Such a forward looking driver assist system can aid a driver in the operation of a motor vehicle by providing operational information such as a potential collision, lane or roadway departure, location of pedestrians, road sign information, etc. Driver assist systems could also be mounted to other vehicle locations such as the rear window. Data from the driver assist system is provided to other vehicle systems to provide the driver with a warning, haptic or tactile feedback, and/or autonomous control of the vehicle.

SUMMARY

The present invention relates to a vehicle driver assist system including a mounting bracket connectable with the vehicle and a camera housing connectable with the mounting bracket. One of the mounting bracket and the camera housing includes a channel for receiving a tab on the other of the mounting bracket and the camera housing. The tab on the other of the mounting bracket and the camera housing slides into the channel in the one of the mounting bracket and the camera housing to connect the camera housing to the mounting bracket. The one of the mounting bracket and the camera housing has a flexible member that engages the tab to damp movement of the housing relative to the mounting bracket.

BRIEF DESCRIPTION OF THE DRAWINGS

The foregoing and other features and advantages of the present invention will become apparent to one skilled in the art upon consideration of the following description of the invention and the accompanying drawings, in which.

DETAILED DESCRIPTION

Figure 1:
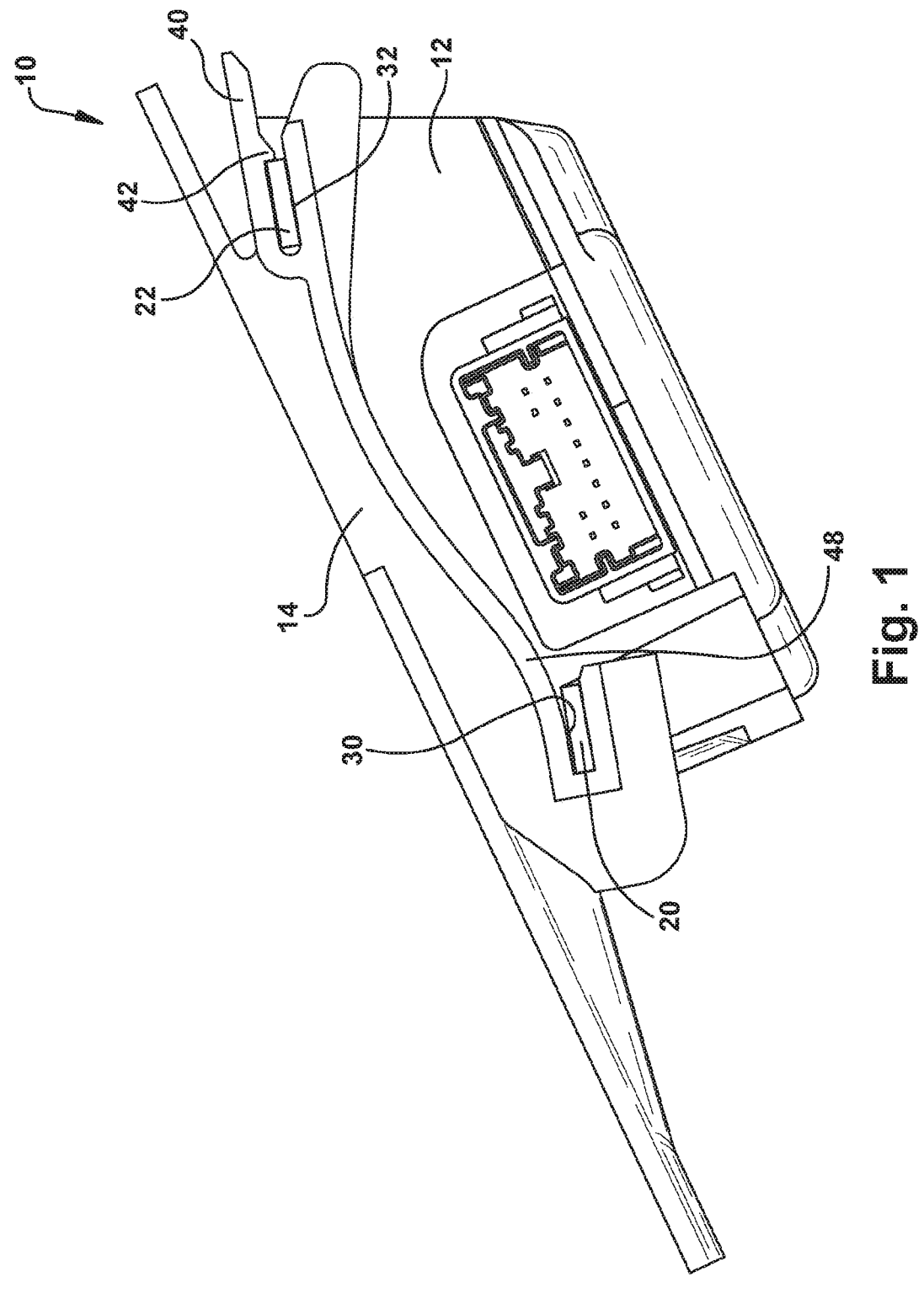
FIG. 1 is a schematic view of a driver assist system constructed in accordance with a first embodiment of the present invention.
Figure 2:
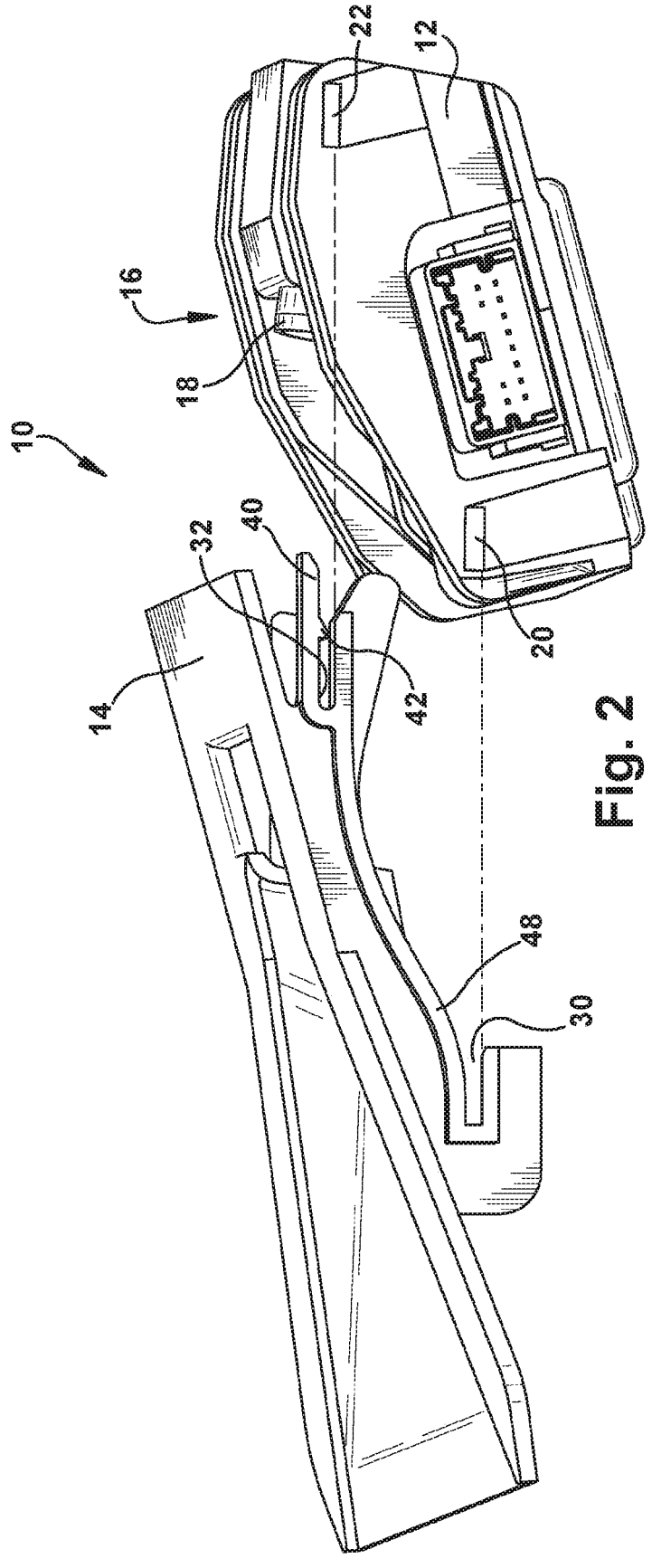
FIG. 2 is an exploded view of the driver assist system of FIG. 1.

A driver assist system 10 constructed in accordance with a first embodiment of the present invention is shown in FIGS. 1-2. The driver assist system 10 may be a forward looking system and may be mounted to a front windshield of a vehicle. The driver assist system 10 views the environment forward of the vehicle and analyzes monitored information for vehicle functions, such as lane keeping, roadway departures, pedestrian information, road sign information, etc. The analyzed information is then further processed and used by vehicle control systems and/or warning systems. Those skilled in the art will appreciate that the present invention is applicable to other driver assist systems such as a rearward facing system for monitoring the environment rearward of the vehicle.

The driver assist system 10 includes a camera housing 12 secured in a mounting bracket 14. A camera 16 with a lens 18 is mounted within the camera housing 12. The camera 16 is operatively connected to data processing circuitry (not shown) within the camera housing 12 for processing any image within the field of view of the camera. The circuitry within the housing 12 is connectable with other vehicle systems.

The camera housing 12 includes at least one forward or first tab 20 on the camera housing. It is contemplated that the housing 12 may include any desired number of forward tabs 20 and, preferably, two forward tabs 20 extending from opposite sides of the housing 12. The housing 12 also includes at least one rearward or second tab 22 on the camera housing. It is contemplated that the housing 12 may include any desired number of rearward tabs 22 and, preferably, two rearward tabs 22 extending from opposite sides of the housing 12. The forward and rearward tabs 20, 22 on the housing 12 may extend parallel to each other.

The mounting bracket 14 is connectable to the windshield in any desired manner, such as, by an adhesive. The mounting bracket 14 includes at least one forward or first channel or slot 30 and at least one rearward or second channel or slot 32. It is contemplated that the bracket 14 may include any desired number of forward and rearward channels 30, 32 and, preferably, includes two forward channels and two rearward channels on opposite sides of the bracket. The forward and rearward channels 30, 32 on the mounting bracket 14 may extend parallel to each other. The forward channels 30 on the mounting bracket 14 receive the forward or first tabs 20 on the camera housing 12 and the rearward channels 32 on the bracket receive the rearward tabs 22 on the camera housing.

At least one of the rearward channels 32 is at least partially defined by a flexible member 40 having a detent 42. It is contemplated that all of the rearward channels 32 may be defined by flexible members 40 and that all of the flexible members include detents 42. At least one detent 42 engages at least one of the rearward tabs 22 to connect the housing 12 to the bracket 14.

The first and second tabs 20, 22 on the housing 12 slide into the first and second channels 30, 32 on the bracket 14 to connect the housing to the bracket. The forward tabs 20 on the housing 12 may slide along guide members or ribs 48 on the bracket to guide the forward tabs into the forward channels 30. The flexible members 40 move upward when the rearward tabs 22 engage the detents 42 upon insertion of the rearward tabs into the rearward channels 32. The tabs 20,22 on the housing 12 are slid into the bracket 14 until the rearward tabs 22 slide past the detents 42. The rearward tabs 22 snap into the rearward channels 32 so that the detents 42 retain the rearward tabs in the rearward channels to connect the housing 12 to the bracket 14. The flexible members 40 help dampen motion of the camera housing 12 during operation of the vehicle. It is contemplated that at least one of the forward channels 30 may be defined by a flexible member with a detent so that the forward tabs 20 snap into the forward channels.

Figure 3:
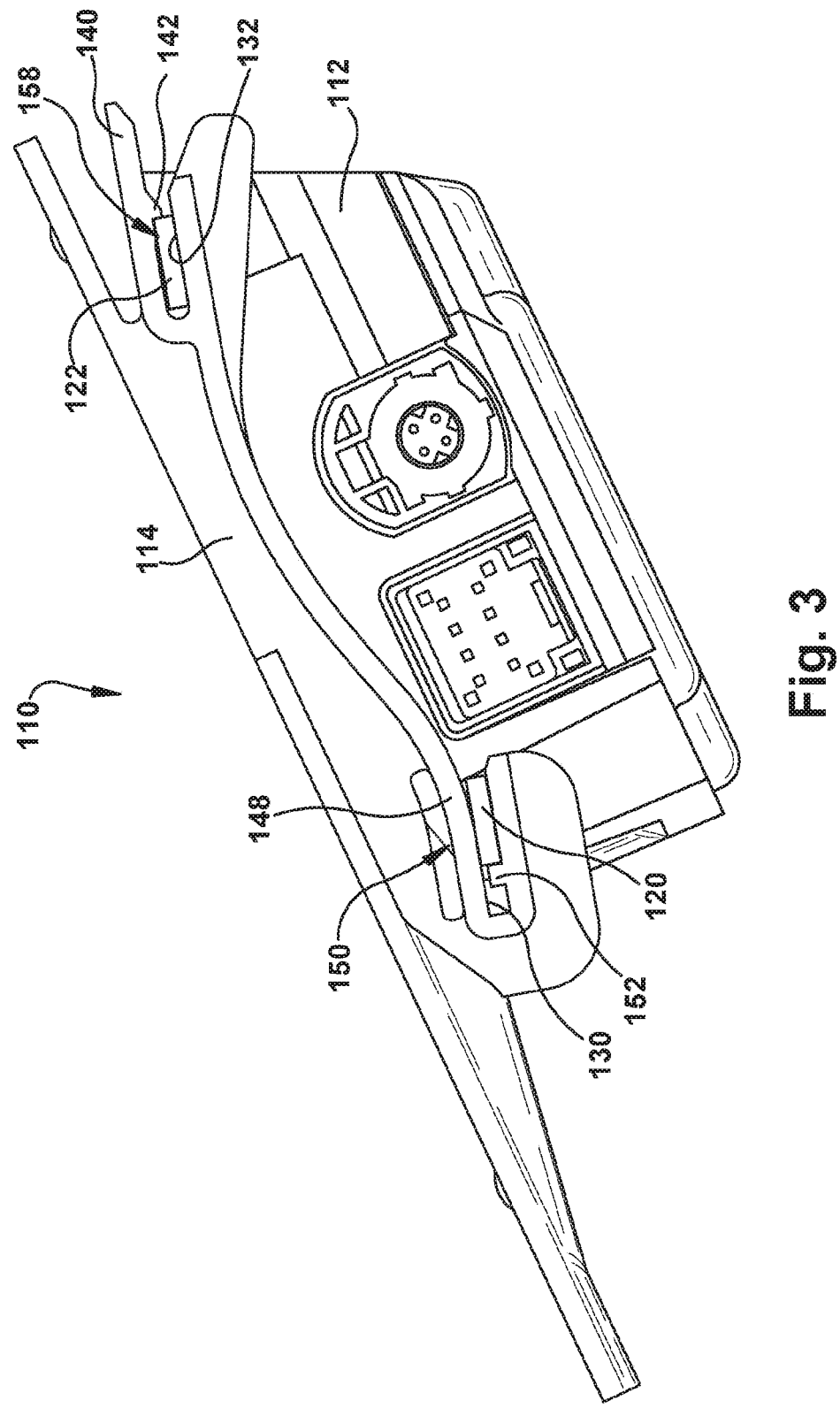
FIG. 3 is a schematic view of a driver assist system constructed in accordance with a second embodiment of the present invention.
Figures 4, 5:
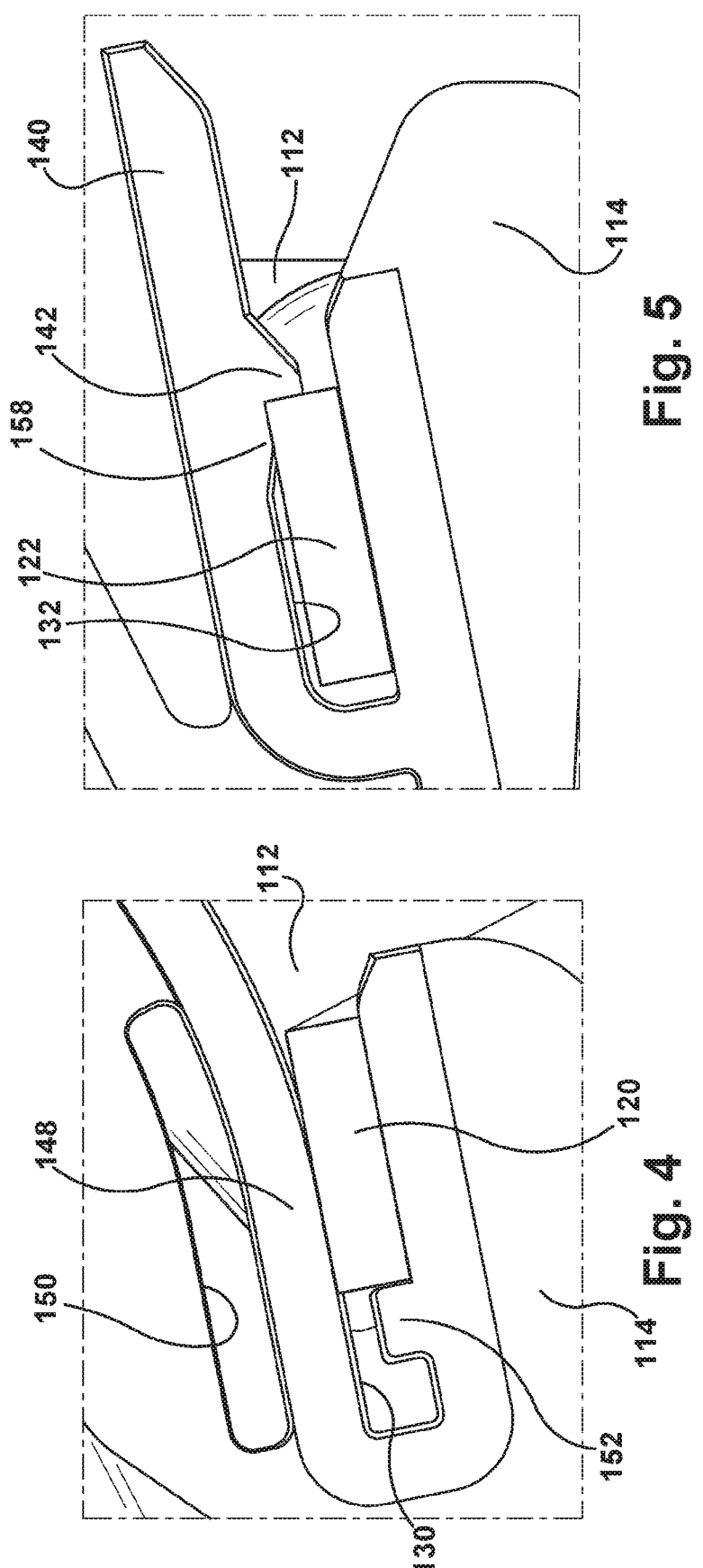
FIG. 4 is an enlarged view of a portion of the driver assist system of FIG. 3.
FIG. 5 is an enlarged view of another portion of the driver assist system of FIG. 3.

A driver assist system 110 constructed in accordance with a second embodiment of the present invention is shown in FIGS. 3-5. The driver assist system 110 illustrated in FIGS. 3-5 is generally similar to the embodiment of FIGS. 1-2. The forward tabs 120 on the camera housing 112 of FIGS. 3-5 have an interference fit with the forward channels 130 on the mounting bracket 114. The mounting bracket 114 includes slots 150 adjacent the guide members or ribs 148 and the forward channels 130 to permit the guide ribs to flex during insertion of the forward tabs 120 into the forward channels.

Stops 152 may extend toward the guide ribs 148 into the forward channels 130. The forward tabs 120 may engage the stops 152 when the forward tabs are inserted into the forward channels 130. The stops 152 prevent the lens extending from the camera housing 112 from engaging the window when the housing is inserted into the bracket 114. The stops 152 are spaced from ends of the slots 130 to provide strain relief to help prevent the mounting bracket from breaking.

The rearward tabs 122 on the housing 112 may have an interference fit with the rearward channels 132 on the mounting bracket 114. Projection 158 on the flexible members 140 of the mounting bracket 114 engage the tabs 122 on the housing 112 to provide the interference fit. The projections 158 may be located adjacent the detents 142 on the flexible members 140.

The first and second tabs 120, 122 on the housing 112 slide into the first and second channels 130, 132 on the bracket 114 to connect the housing to the bracket. The forward tabs 120 on the housing 112 may slide along the flexible guide members or ribs 148 on the bracket 114 to guide the forward tabs into the forward channels 130. The flexible members 140 move upward when the rearward tabs 122 engage the detents 142 upon insertion of the rearward tabs into the rearward channels 132. The tabs 120,122 on the housing 112 are slid into the bracket 114 until the forward tabs 120 engage the stops 152 and the rearward tabs 122 slide past the detents 142. The rearward tabs 122 snap into the rearward channels 132 so that the detents 142 retain the rearward tabs in the rearward channels to connect the housing 112 to the bracket 114. The flexible members 140 and flexible guide ribs 148 help dampen motion of the camera housing 12 during operation of the vehicle.

Figure 6:
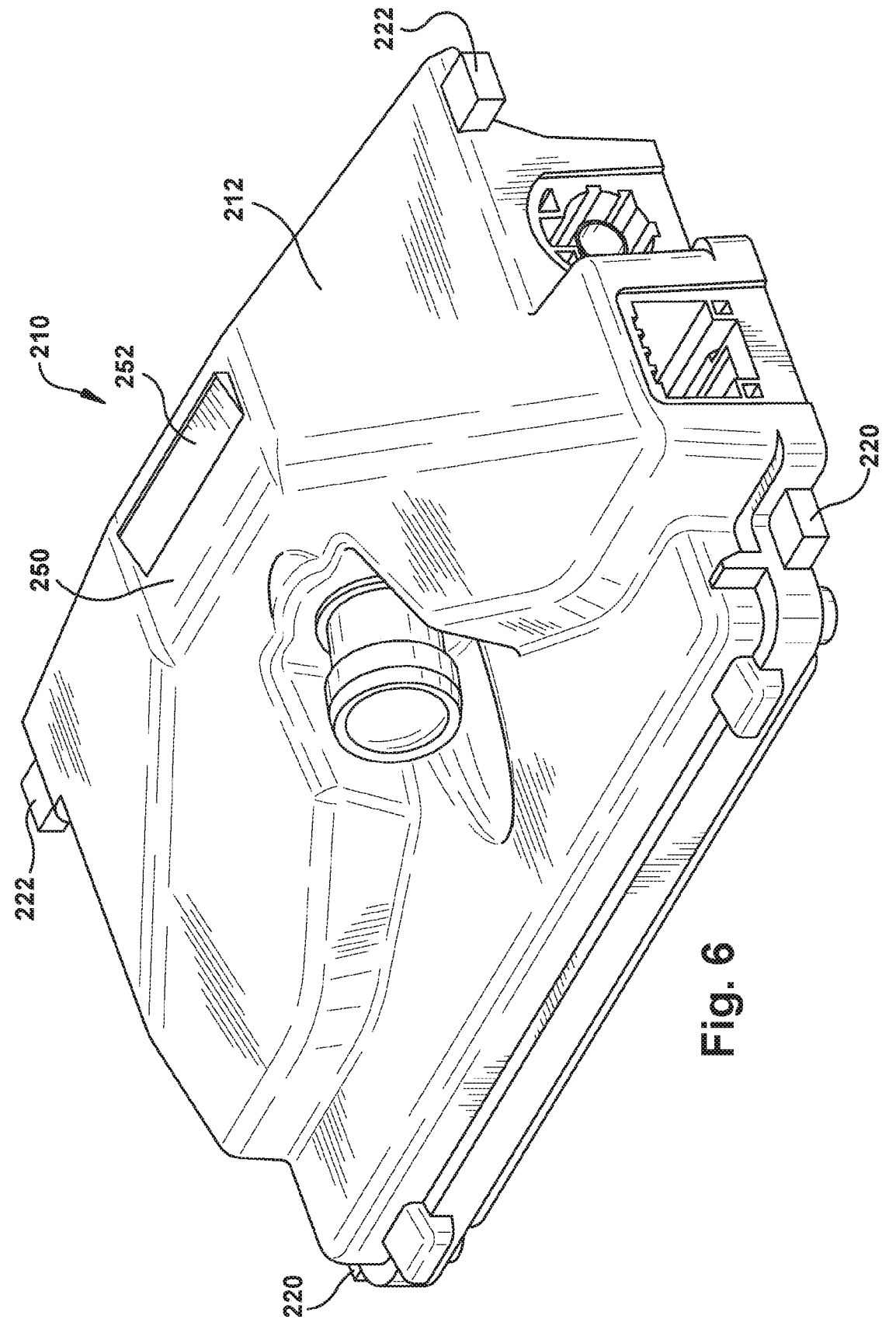
FIG. 6 is a schematic view of a camera housing of a driver assist system constructed in accordance with another embodiment of the present invention.

A driver assist system 210 constructed in accordance with another embodiment of the present invention is shown in FIG. 6. The driver assist system 210 illustrated in FIG. 6 is generally similar to the embodiments of FIGS. 1-5. The camera housing 212 of FIG. 6 has forward and rearward tabs 220, 222 that slide into channels on a mounting bracket (not shown). The channels of the mounting bracket may be similar to the channels 30, 32, 130, 132 of the embodiments of FIGS. 1-5. A top 250 of the camera housing 212 also includes a projection 252 that may engage a flexible detent member on the mounting bracket to retain the housing in the bracket.

Figure 7:
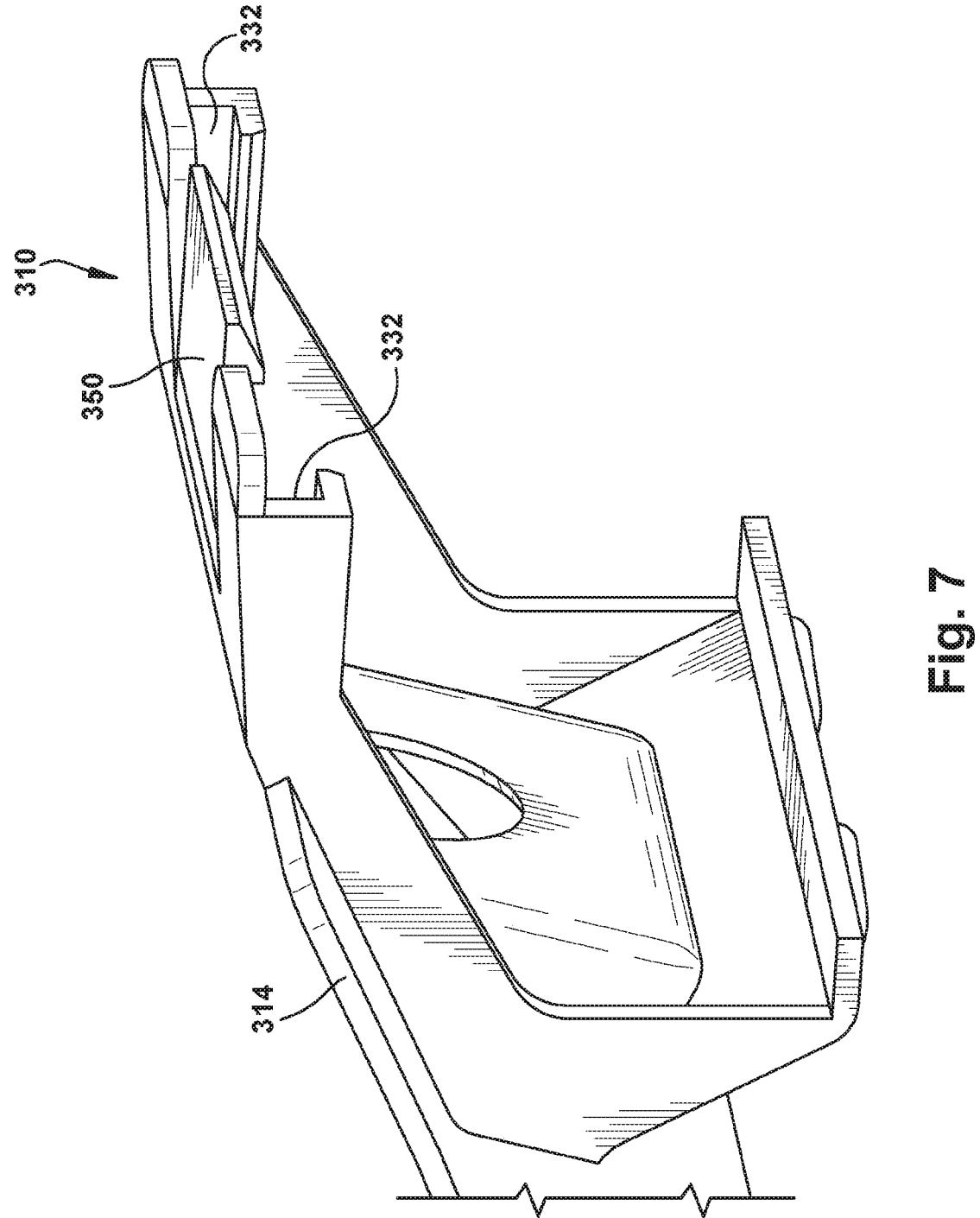
FIG. 7 is a schematic view of a mounting bracket of a driver assist system constructed in accordance with another embodiment of the present invention.
Figure 8:
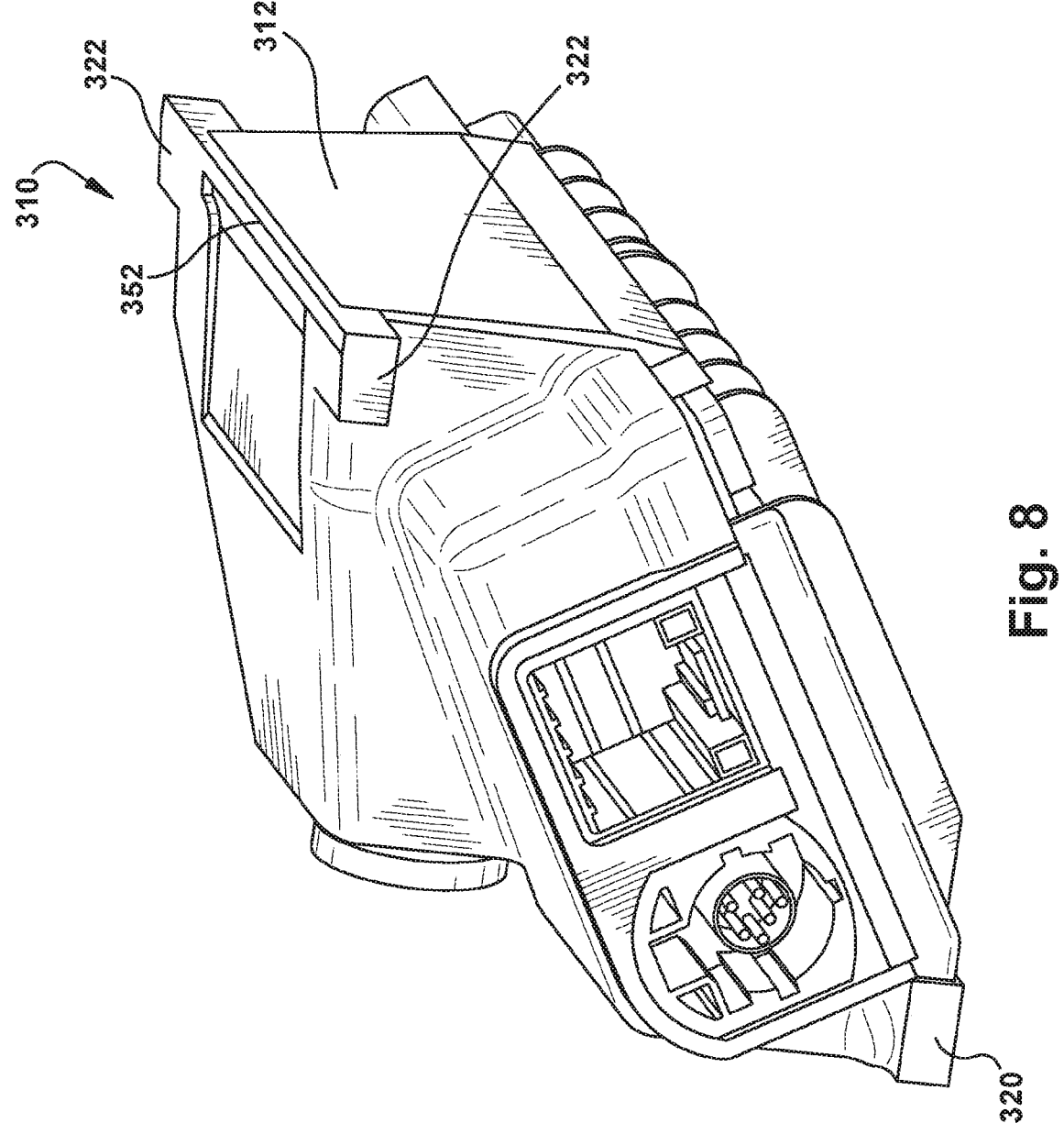
FIG. 8 is a schematic view of a camera housing for use with the mounting bracket of FIG. 7.
Figures 9, 10:
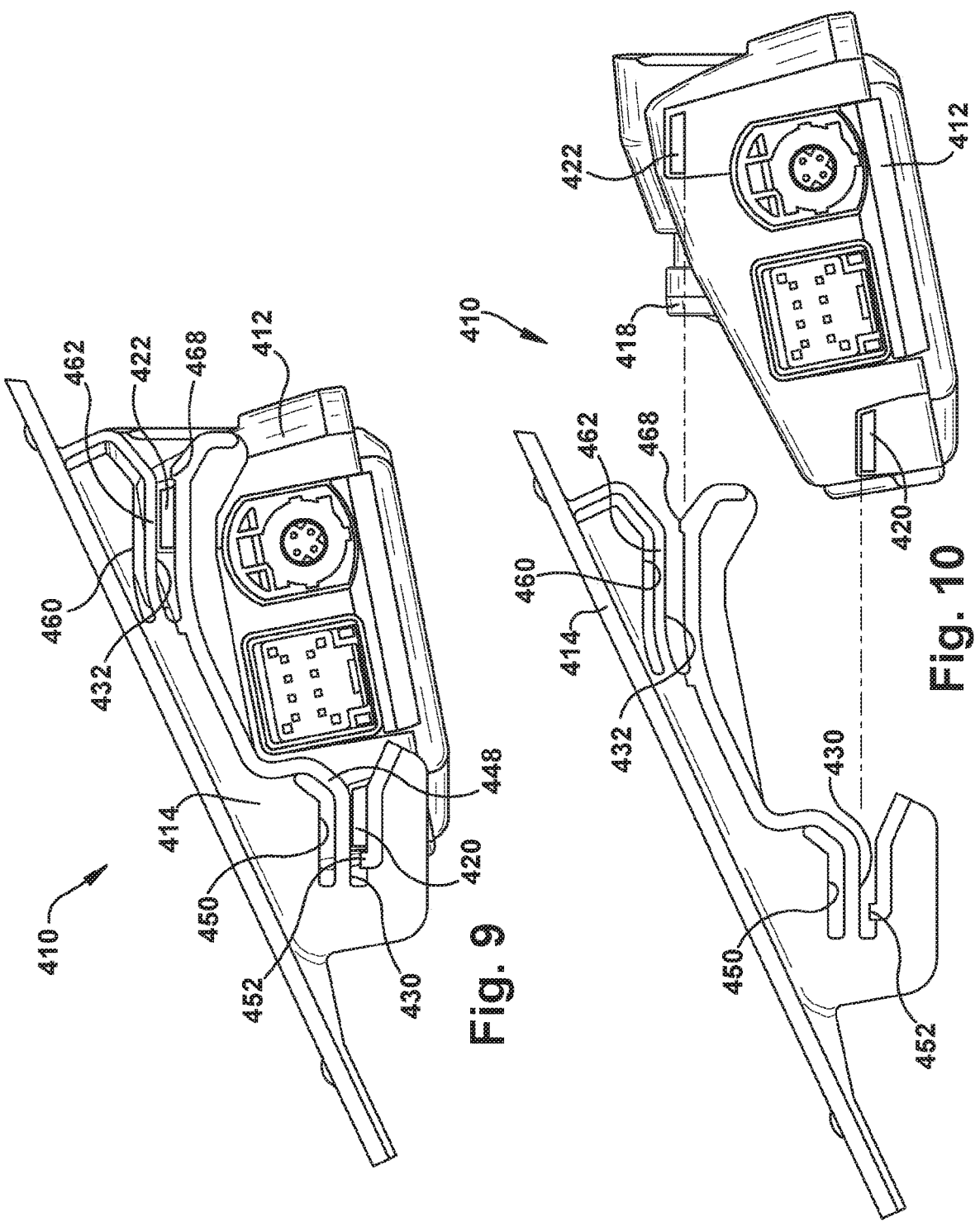
FIG. 9 is a schematic view of a driver assist system constructed in accordance with another embodiment of the present invention.
FIG. 10 is an exploded view of the driver assist system of FIG. 9.
Figure 12:
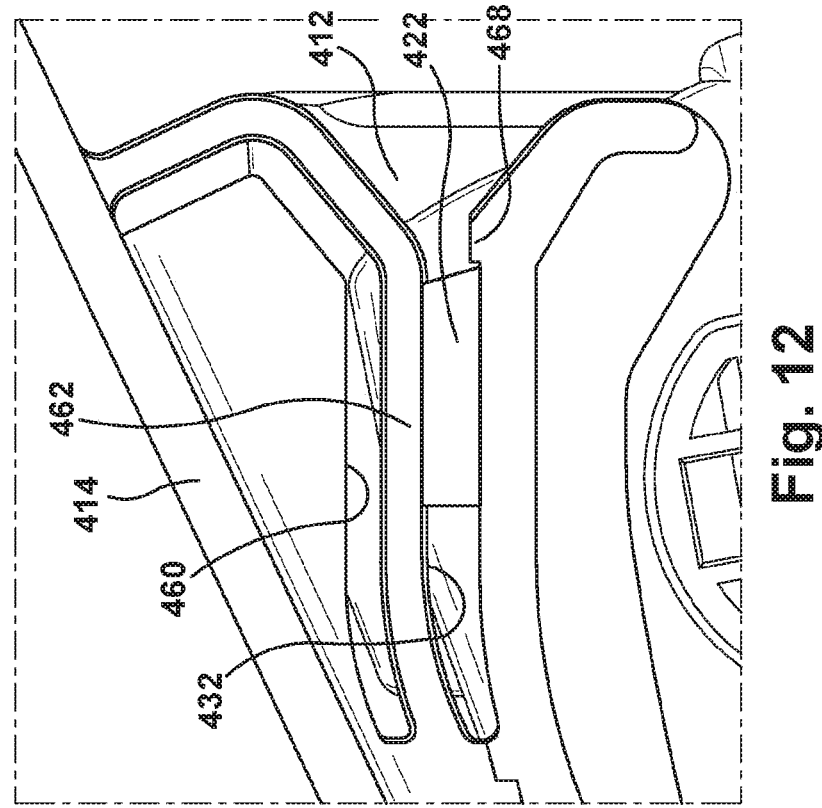
FIG. 12 is an enlarged view of another portion of the driver assist system of FIG. 9.
Figure 11:
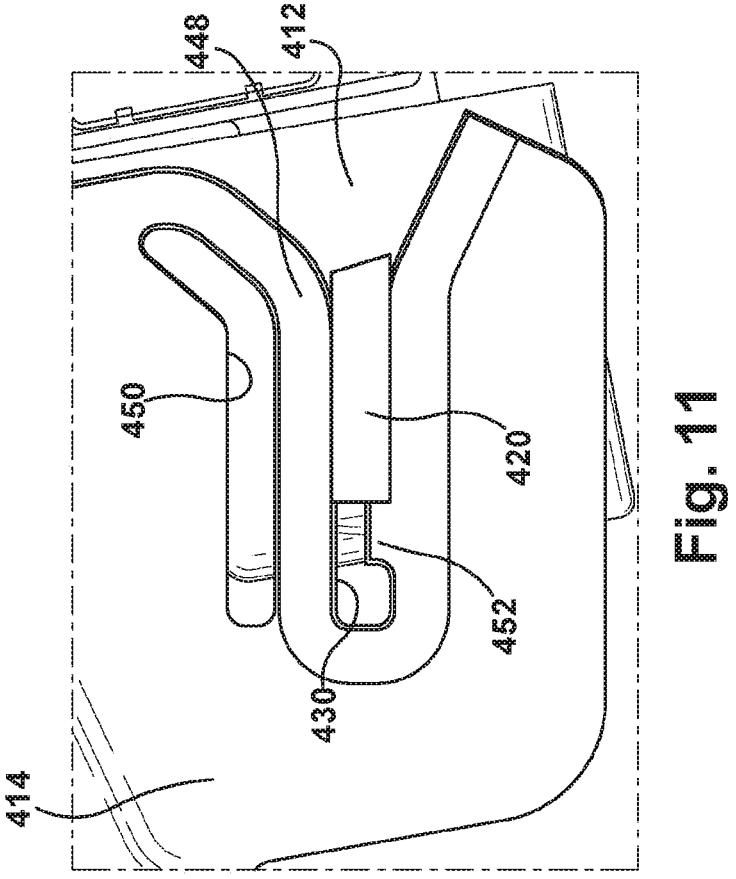
FIG. 11 is an enlarged view of a portion of the driver assist system of FIG. 9.

A driver assist system 310 constructed in accordance with another embodiment of the present invention is shown in FIGS. 7-8. The driver assist system 310 illustrated in FIGS. 7-8 is generally similar to the embodiments of FIGS. 1-6. The camera housing 312 of FIG. 8 has forward and rearward tabs 320, 322 that slide into channels 332 on a mounting bracket 314 (FIG. 7). The mounting bracket 314 includes a flexible detent member 350 that engages a rear edge 352 of the housing 312 to connect the housing to the mounting bracket.

A driver assist system 410 constructed in accordance with another embodiment of the present invention is shown in FIGS. 9-12. The driver assist system 410 illustrated in FIGS. 9-12 is generally similar to the embodiment of FIGS. 3-5. The first or forward tabs 420 on the camera housing 412 of FIGS. 9-12 have an interference fit with the first or forward channels 430 on the mounting bracket 114. The second or rearward tabs 422 on the camera housing 412 also have an interference fit with the second or rearward channels 432 on the mounting bracket 414.

The mounting bracket 414 includes slots 450 adjacent the guide members or ribs 448 and the forward channels 430 to permit the guide ribs 448 to flex during insertion of the forward tabs 420 into the forward channels. Stops 452 may extend toward the guide ribs 448 into the forward channels 430. The forward tabs 420 may engage the stops 452 when the forward tabs are inserted into the forward channels 430. The stops 452 prevent the lens 418 extending from the camera housing 412 from engaging the window when the housing is inserted into the bracket 414. The stops 452 are spaced from ends of the slots 430 to provide strain relief to help prevent the mounting bracket from breaking.

The mounting bracket 414 includes slots 460 adjacent flexible guide members or ribs 462 and the rearward channels 432 to permit the guide ribs to flex during insertion of the rearward tabs 422 into the rearward channels. Detents 468 extend from portions of the bracket 414 defining rearward channels 432 that is opposite to the guide ribs 462. The detents 468 extend into the rearward channels 432 and engage the rearward tabs 422 on the camera housing 412 to retain the camera housing in the bracket.

The first and second tabs 420, 422 on the housing 412 slide into the first and second channels 430, 432 on the bracket 414 to connect the housing to the bracket. The forward tabs 420 on the housing 412 may slide along the flexible guide members or ribs 448 on the bracket 414 to guide the forward tabs into the forward channels 430. The flexible guide members or ribs 462 move upward when the rearward tabs 422 engage the detents 468 upon insertion of the rearward tabs into the rearward channels 432. The tabs 420,422 on the housing 412 are slid into the bracket 414 until the forward tabs 420 engage the stops 452 and the rearward tabs 422 slide past the detents 468. The rearward tabs 422 snap into the rearward channels 432 so that the detents 468 retain the rearward tabs in the rearward channels to connect the housing 412 to the bracket 414. The flexible guide ribs 448 and flexible guide ribs 462 help dampen motion of the camera housing 412 during operation of the vehicle.

The slots 460 adjacent the guide ribs 462 may limit the amount of movement of the camera housing 412 relative to the bracket 414 during removal of the camera housing from the bracket to help prevent the camera housing and, more specifically, the camera lens 418 from engaging the windshield. An upward force is applied in the middle rear of the camera housing 412 to disengage the rearward tabs 422 on the camera housing from the detents 468 in the rearward channels 432. The guide ribs 462 may deflect and engage the portions of the bracket defining the slots 460 in response to the application of the upward force during removal of the camera housing 412 from the bracket 414. The tabs 420, 422 on the camera housing 412 can be slid out of the bracket 414 to remove the camera housing from the bracket when the detents 468 are disengaged from the tabs 422.

Figures 13, 14, 15:
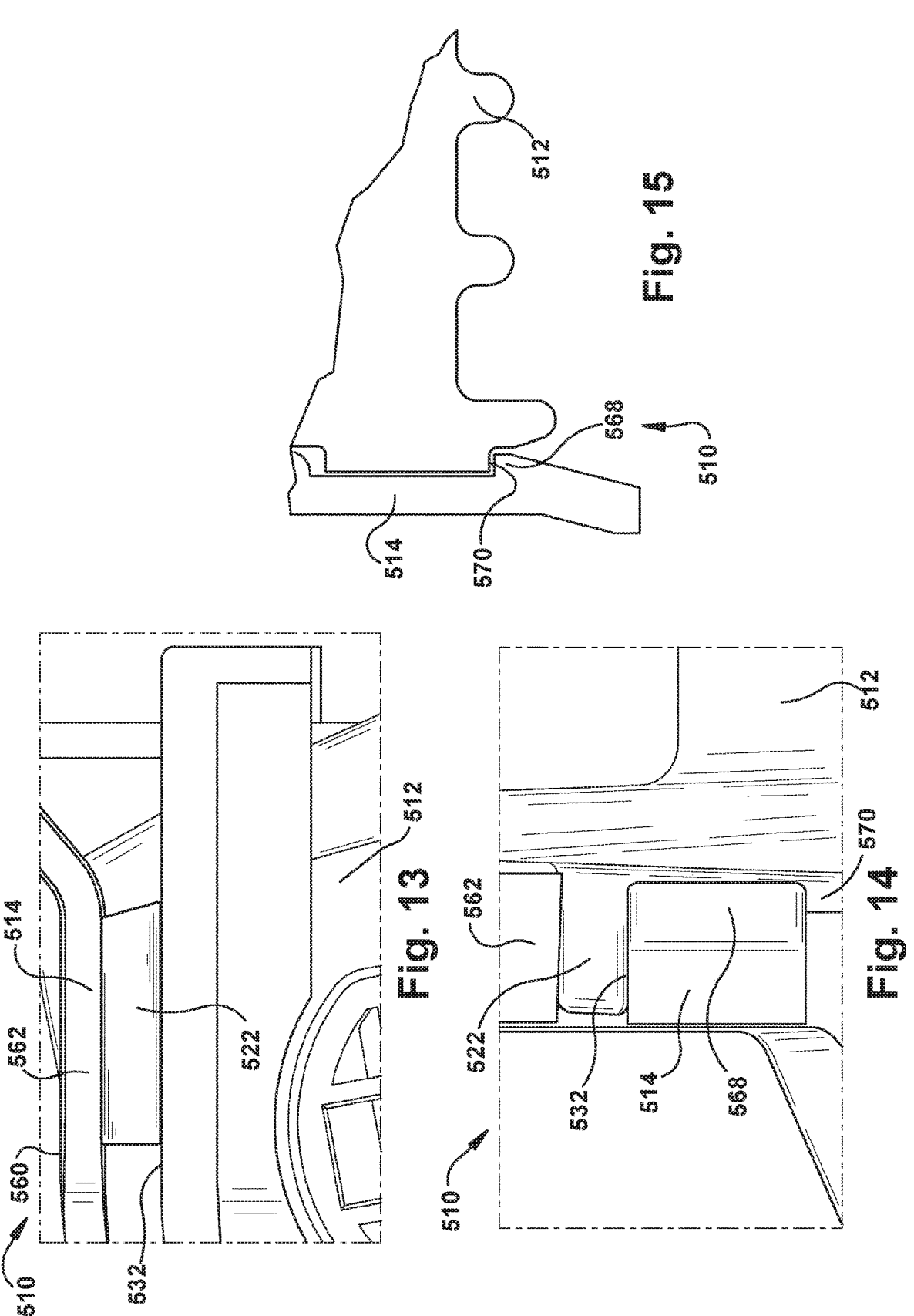
FIG. 13 is an enlarged view of a portion of a driver assist system constructed in accordance with another embodiment of the present invention.
FIG. 14 is a rear view of the enlarged portion of the driver assist system of FIG. 13.
FIG. 15 is a sectional view taken along the line 15-15 of FIG. 14.

A driver assist system 510 constructed in accordance with another embodiment of the present invention is shown in FIGS. 13-15. The driver assist system 510 illustrated in FIGS. 13-15 is generally similar to the embodiment of FIGS. 9-12. The mounting bracket 514 includes slots 560 adjacent a guide ribs 562 and the rearward channels 532 to permit the guide ribs to flex during insertion of the rearward tabs 522 into the rearward channels. Detents 568 extend from a portions of the bracket 514 defining the rearward channels 532 that are opposite to the guide ribs 562. The detents 568 extend generally parallel to the rearward tabs 532 on the housing 514 when the housing is connected to the bracket 514. The detents 568 engage a rear surface 570 on the camera housing 512 to retain the camera housing in the bracket 514.

Although the mounting brackets are described as having channels for receiving tabs on the camera housings, it is contemplated that the mounting brackets may have tabs that are received in channels on the camera housings.

From the above description of the present invention, those skilled in the art will perceive improvements, changes, and modifications. Such improvements, changes, and modifications within the skill of the art are intended to be covered by the appended claims.

Having described the present invention, the following is claimed:

1. A vehicle driver assist system comprising:
mounting bracket connectable with the vehicle and a camera housing connectable with the mounting bracket, the mounting bracket defined by a first terminal end and a second terminal end and having first and second channels disposed on a common side edge disposed between the first and second terminal ends for receiving first and second tabs extending from the camera housing, wherein the first and second tabs slide into the first and second channels to connect the camera housing to the mounting bracket, wherein one of the first and second channels is at least partially defined by a flexible member that engages-the tab to damp movement of the housing relative to the mounting bracket;
wherein the first channel of the mounting bracket is a forward channel and the second channel is a rearward channel, and wherein the first tab of the camera housing is a forward tab that slides into the forward channel and wherein the second tab is a rearward tab that slides into the rearward channel,
wherein the first and second channels are at least partially defined by a guide member engageable with the first and second tabs for guiding insertion of the first and second tabs into the channel; and
wherein the mounting bracket includes at least one slot adjacent the guide member and at least one of the first and second channels, the slot permitting the guide member to deflect relative to the mounting bracket.

2. The vehicle driver assist system according to claim 1, wherein the flexible member extends rearwardly beyond an opening that defines an entrance to the respective channel partially defined by the flexible member.

3. A vehicle driver assist system comprising:
mounting bracket connectable with the vehicle and a camera housing connectable with the mounting bracket, the mounting bracket defined by a first terminal end and a second terminal end and having first and second channels disposed on a common side edge disposed between the first and second terminal ends for receiving first and second tabs extending from the camera housing,
wherein the first and second tabs slide into the first and second channels to connect the camera housing to the mounting bracket,
wherein one of the first and second channels is defined by a flexible member that engages-the tab to damp movement of the housing relative to the mounting bracket;
wherein the flexible member extends rearwardly beyond an opening that defines an entrance to the respective channel partially defined by the flexible member;
wherein the first channel is a forward channel and the second channel is a rearward channel, and wherein the first tab of the camera housing is a forward tab that slides into the forward channel and wherein the second tab is a rearward tab that slides into the rearward channel; and
wherein the first and second channels are at least partially defined by a guide member engageable with the first and second tabs for guiding insertion of the first and second tabs into the channel,
wherein the mounting bracket includes at least one slot adjacent the guide member and at least one of the first and second channels, the slot permitting the guide member to deflect relative to the mounting bracket,
and wherein the guide member engages a portion of the mounting bracket defining the slot to limit movement of the camera housing relative to the mounting bracket.

4. A vehicle driver assist system comprising:
a mounting bracket connectable with a vehicle and a camera housing connectable with the mounting bracket, the mounting bracket defined by a first terminal end and a second terminal end having first and second channels disposed on a common side edge disposed between the first and second terminal ends for receiving first and second tabs extending from the camera housing, wherein the first and second tabs slide into the first and second channels is at least partially defined by a flexible member that engages the tab to damp movement of the housing relative to the mounting bracket, wherein the first channel of the mounting bracket is a forward channel and the second channel is a rearward channel, and wherein the first tab of the camera housing is a forward tab that slides into the forward channel and wherein the second tab is a rearward tab that slides into the rearward channel, wherein the forward channel is at least partially defined by a first guide member engageable with the forward tab for guiding insertion of the forward tab into the forward channel, the bracket including at least one slot adjacent the first guide member and the forward channel that permits the first guide member to deflect relative to the bracket to damp movement of the housing relative to the bracket, the rearward channel being at least partially defined by a second guide member engageable with the rearward tab for guiding insertion of the rearward tab into the rearward channel, the bracket including at least one slot adjacent the second guide member and the rearward channel that permits the second guide member to deflect relative to the bracket to damp movement of the housing relative to the bracket.

5. A vehicle driver assist system as set forth in claim 1 wherein the forward tab extends parallel to the rearward tab.

6. A vehicle driver assist system as set forth in claim 1 wherein at the mounting bracket includes a flexible detent member engageable with the camera housing to connect the camera housing to the mounting bracket.

7. A vehicle driver assist system as set forth in claim 1 wherein the first and second tabs have an interference fit with the channel.

8. A vehicle driver assist system as set forth in claim 1 wherein the guide member engages a portion of the mounting bracket defining the slot to limit movement of the camera housing relative to the mounting bracket.

9. A vehicle driver assist system as set forth in claim 8 wherein the guide member engages the portion of the mounting bracket defining the slot to prevent a camera lens connected to the camera housing from engaging a window to which the mounting bracket is attached.

10. A vehicle driver assist system as set forth in claim 1 wherein the forward channel is at least partially defined by a first guide member engageable with the forward tab for guiding insertion of the forward tab into the forward channel, the bracket including at least one slot adjacent the first guide member and the forward channel that permits the first guide member to deflect relative to the bracket to damp movement of the housing relative to the bracket, the rearward channel being at least partially defined by a second guide member engageable with the rearward tab for guiding insertion of the rearward tab into the rearward channel, the bracket including at least one slot adjacent the second guide member and the rearward channel that permits the second guide member to deflect relative to the bracket to damp movement of the housing relative to the bracket.

11. A vehicle driver assist system as set forth in claim 1 wherein a stop extends into at least one of the first and second channels, the stop being spaced from an end of the channel, the tab engaging the stop when the housing is engaged with the mounting bracket.

12. A vehicle driver assist system as set forth in claim 6 wherein the detent extends parallel to one of the first and second tabs when the housing is connected to the mounting bracket, the detent engaging a rear surface on the housing to retain the camera housing in the mounting bracket.

\* \* \* \* \*